United States Patent Office 3,349,672
Patented Oct. 31, 1967

3,349,672
PISTON FOR INTERNAL COMBUSTION ENGINES
Alfred Meier, Nellingen uber Esslingen, Eberhard Kohl, Stuttgart, and Eberhard Rossmann, Schmiden, Germany, assignors to Mahle Komm.-Ges., Stuttgart-Bad Cannstatt, Germany
Filed Oct. 4, 1965, Ser. No. 492,427
Claims priority, application Germany Nov. 25, 1964, M 63,243
3 Claims. (Cl. 92—231)

ABSTRACT OF THE DISCLOSURE

A collar is inserted in the ring zone of a piston to form a hollow chamber between the collar and the piston head. The seam between the collar and piston head is directed toward the interior of the chamber and is welded by a charged particle beam. A seam portion of the piston head extends beyond the weld and into the chamber and is so thin as to exclude any significant stresses therein.

---

Figure 1:
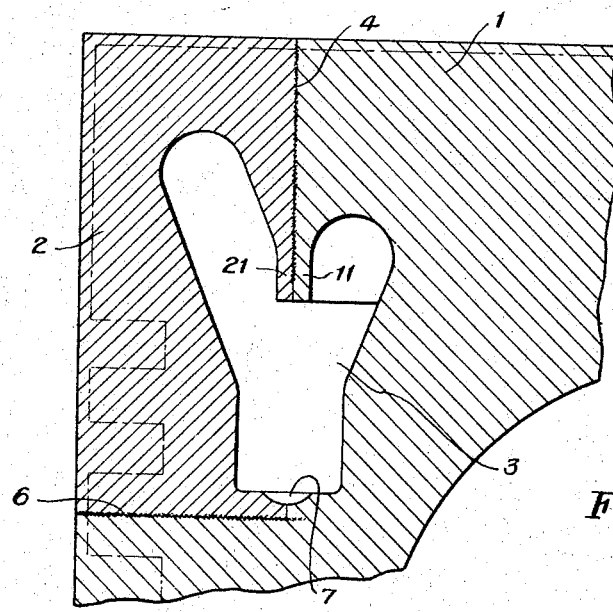

This invention relates to a piston for internal combustion engines and in particular relates to a piston having a piston head with a reduced area in the piston ring zone, a collar seated in said zone, and a hollow chamber between the piston head and the collar which is used, for example, for the passage of cooling oil.

In the production of such a piston, it is known to secure the collar to the piston head by welding a V-shaped seam between the piston head and the collar. Such is not completely satisfactory for making light metal pistons because the V-shaped welding seams may only be relatively shallow and because it is difficult to produce a uniform quality of seam from piston to piston and to detect any faulty seams. Furthermore, stresses are created by the uneven heating caused by the welding which reduces the strength of the weld seam and may be the cause for the occurrence of cracks.

As disclosed in the patent to Steigerwald, U.S. Patent No. 2,987,610, such disadvantages can be largely avoided by using an electrically charged particle beam for the welding. The intensity of this beam can be selected so that it completely penetrates the material being welded. As stated in the aforesaid patent, it can be assured that the welded parts are connected together across the entire depth of the seam. Such would be expected to be especially advantageous in the making of pistons as described above.

However, the advantage of such expectation does not exist. When using the charged particle beam welding, it had been found that the beam penetrates into the hollow chamber between the piston head and collar and carries along with it particles of material which are deposited in the chamber, and which later can enter the oil circulating system, and further that the portion of the welding seam immediately adjacent the hollow chamber can become more or less porous. The pores and faults will produce a groove effect and stresses which encourage the formation of cracks. If the intensity of the charged particle beam is made so small that the beam does not penetrate the entire seam, then no material particles will reach the hollow chamber but the unwelded portion of the seam adjacent the hollow chamber will even more form an opportunity and starting point for cracks which will branch out from there. It is not feasible to select a beam intensity so that the beam will penetrate exactly up to the limiting surface because of the impossibility of exact adjustment of the beam.

The object of this invention is to produce a solution for avoiding the difficulties above stated. In this invention, charged particle beam welding is used to weld the seam between the piston head and the collar. The piston head at least has a projection of its seam portion extending into the hollow chamber beyond the weld and such projection has a weak wall so as to prevent or exclude the formation of stresses therein. This permits a tolerance of the actual penetration depth of the weld within the seam without impairing the quality of the welding connection. It also assures, up to a certain point, the welding of the thin wall portions lying beyond the depth to which the charged particle beam reaches because the thin wall portions heat to a higher temperature inasmuch as they do not have enough cross-sectional area for the dissipation of the heat. Above all, this invention assures that the unavoidable welding faults now lie in weak wall parts which are not stressed and are therefore not starting points for cracks caused by stresses. The selection of the appropriate wall thickness depends largely upon the characteristics of the metal. The wall thickness is, for example, between 1 and 2 mm. for light metals. Less thicknesses can be used for materials having more heat conductivity and higher tensile strength.

Figure 2:
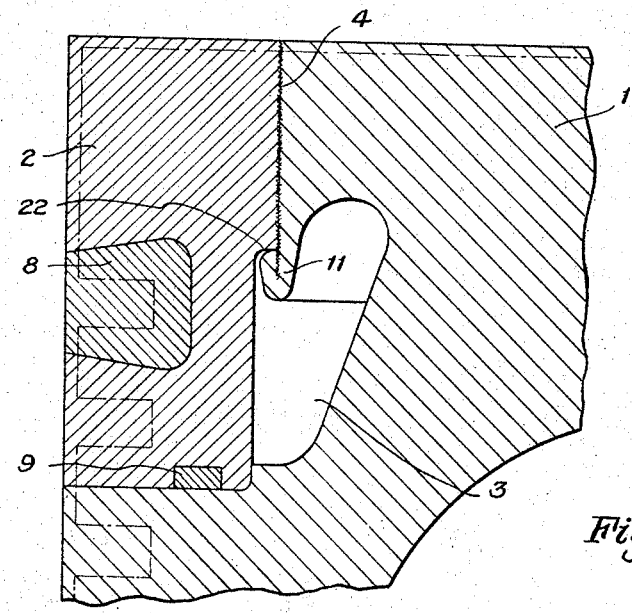

The means by which the objects of the invention are obtained are described more fully with reference to the accompanying drawings in which:

FIGURE 1 is a cross-sectional view of a portion of a piston showing the welded seam of this invention; and FIGURE 2 is a similar view of a modified form of the invention.

The piston head 1 in FIGURE 1 is of reduced area in the piston ring zone with a collar 2 seated in said zone. The unfinished piston is outlined in full lines, which piston is then turned down to finished form as shown by the dot-dash lines. A hollow chamber 3 is formed between the piston head and the collar. The seam between the piston head and collar is welded by charged particle beams. This weld 4 penetrates to a depth as shown by the $x$ hatching. It is less than the full depth of the seam. In this invention, the seam portion of the piston head has a projection 11 extending into the hollow chamber and the collar likewise has an annular projection 21. These projections extend beyond the depth of the weld 4 and have walls which are so thin that they are welded together because of their inability to dissipate the heat caused by the weld 4 and therefore any faults in the weld 4 cannot start the formation of stress cracks because no stresses or only insignificant ones can occur in the projections 11 and 21.

The joint between the bottom of the collar 2 and the piston head is also welded by a charged particle beam to form a weld 6 as shown by the $x$ hatching. A groove 7 in the bottom of the hollow chamber 3 forms thin wall portions in the piston head and collar which function as the thin wall portions or projections 11 and 21.

As shown in FIGURE 2, the collar 2 has a ring carrier 8 embedded therein in a conventional manner. Collar 2 also has a shoulder 22 which rests on a corresponding ledge on the projection 11 of the piston head. The weld 4 ends at approximately this point. The joint between the bottom of collar 2 and the piston head is not welded. Instead the collar 2 has a groove which contains a seal 9 of a heat-durable material as, for example, a seal composed of a synthetic polymer such as polytetrafluoroethylene.

In order to keep the welded seams 4 and 6 free of cracking stresses, it is preferred that the collars 2 be composed of a material whose coefficient of heat expansion is less than that of piston head 1.

Having now described the means by which the objects of the invention are obtained,

We claim:
1. In an internal combustion engine piston having a piston head of reduced area in the piston ring zone, a collar in said zone, a hollow chamber between said piston head and said collar, a seam formed between a portion of said head and said collar and a charged particle beam weld in the seam between said piston head and said collar, the improvement comprising a projection of the seam portion of said piston head in the direction of said seam extending beyond said weld and into the interior of said chamber, said projection having such a weak wall as to exclude stresses therein.

2. In a piston as in claim 1, said projection having a wall thickness of from about 1 to 2 mm.

3. In a piston as in claim 2, further comprising a shoulder on said collar resting on a ledge on said projection.

References Cited

UNITED STATES PATENTS

| | | | |
|---|---|---|---|
| 2,198,689 | 4/1940 | Wills | 29—156.5 X |
| 2,537,174 | 1/1951 | Townhill | 123—41.16 |
| 2,720,193 | 10/1955 | Maybach | 92—186 X |
| 2,806,750 | 9/1957 | Gehres | 92—186 X |
| 2,818,841 | 1/1958 | Nichols | 92—186 X |
| 3,189,010 | 6/1965 | Isley | 92—222 X |
| 3,190,273 | 6/1965 | Bachle et al. | 92—231 X |

FOREIGN PATENTS

| | | |
|---|---|---|
| 947,840 | 8/1956 | Germany. |
| 363,417 | 12/1931 | Great Britain. |
| 718,612 | 11/1954 | Great Britain. |
| 407,222 | 9/1944 | Italy. |

MARTIN P. SCHWADRON, *Primary Examiner.*

G. N. BAUM, *Assistant Example.*